US012670128B2

(12) United States Patent
Lázaro Blasco et al.

(10) Patent No.: US 12,670,128 B2
(45) Date of Patent: Jun. 30, 2026

(54) METHOD FOR TRANSFERRING AN IBLT DATA STRUCTURE AND USER TERMINAL

(71) Applicant: Deutsches Zentrum für Luft—und Raumfahrt e.V., Bonn (DE)

(72) Inventors: Francisco Lázaro Blasco, Wessling (DE); Balázs Matuz, Wessling (DE)

(73) Assignee: Deutsches Zentrum für Luft—und Raumfahrt e.V., Bonn (DE)

( * ) Notice: Subject to any disclaimer, the term of this patent is extended or adjusted under 35 U.S.C. 154(b) by 0 days.

(21) Appl. No.: 18/853,308

(22) PCT Filed: Jul. 12, 2023

(86) PCT No.: PCT/EP2023/069266
§ 371 (c)(1),
(2) Date: Oct. 1, 2024

(87) PCT Pub. No.: WO2024/013210
PCT Pub. Date: Jan. 18, 2024

(65) Prior Publication Data
US 2025/0252084 A1      Aug. 7, 2025

(30) Foreign Application Priority Data

Jul. 14, 2022     (DE) ..................... 10 2022 117 663.0

(51) Int. Cl.
G06F 16/00        (2019.01)
G06F 16/178       (2019.01)
G06F 16/901       (2019.01)

(52) U.S. Cl.
CPC ........ G06F 16/178 (2019.01); G06F 16/9014 (2019.01)

(58) Field of Classification Search
CPC .............................. G06F 16/178; G06F 16/00
See application file for complete search history.

(56) References Cited

U.S. PATENT DOCUMENTS

| | | | |
|---|---|---|---|
| 2008/0282355 A1* | 11/2008 | Nemazi ................... | G06F 21/64 |
| | | | 707/999.102 |
| 2012/0011150 A1 | 1/2012 | Swaminathan et al. | |
| 2022/0391369 A1* | 12/2022 | Müller Graf ..... | G06F 16/24553 |

OTHER PUBLICATIONS

Byers, John W et al., "A Digital Fountain Approach to Reliable Distribution of Bulk Data", SIGCOMM '98 Vancouver, B.C., 1998, pp. 56-67.

(Continued)

*Primary Examiner* — Cheryl Lewis
(74) *Attorney, Agent, or Firm* — The Webb Law Firm

(57)      ABSTRACT
The invention relates to a method transferring an Invertible Bloom Lookup Table (IBLT) data structure from a first user terminal to a second user terminal. The first user terminal and the second user terminal are within a common network and each have a computing unit, a memory unit and a communication unit. The method includes the first user terminal splits the IBLT data structure into individual data packages, wherein the individual data packages have at least one cell of the IBLT data structure; and the first user terminal successively transfers the individual data packages of the IBLT data structure to the second user terminal until a predefined termination criterion has been reached.

14 Claims, 4 Drawing Sheets

(a) $\ell = 0$ (b) $\ell = 1$ (c) $\ell = 2$ (d) $\ell = 3$ (e) $\ell = 4$

(56) References Cited

OTHER PUBLICATIONS

Eppstein, David et al., "What's the Difference? Efficient Set Reconciliation without Prior Context", SIGCOMM '11 Toronto, Ontario, Canada, Aug. 15-19, 2011, pp. 218-229.

Goodrich, Michael T. et al., "Invertible Bloom Lookup Tables", 49th Annual Allerton Conference on Communication, Control, and Computing, Oct. 4, 2015.

Karpovsky, Mark G. et al., "Data Verification and Reconciliation with Generalized Error-Control Codes", IEEE, 2003.

Lazaro, Francisco et al., "Irregular Invertible Bloom Look-Up Tables", IEEE, 2021.

Luby, Michael G. et al., "Analysis of Random Processes via and-or Tree Evaluation", Society for Industrial and Applied Mathematics, 1998, pp. 364-373.

Minsky, Yaron et al., "Set Reconciliation with Nearly Optimal Communication Complexity", IEEE Transactions on Information Theory, Apr. 29, 2004, pp. 2213-2218, vol. 49, No. 9.

Mitzenmacher, Michael et al., "Simple Multi-Party Set Reconciliation", Distrib. Comput., Nov. 2018, pp. 441-453, vol. 31, No. 6.

Narayanan, Krishna R et al., "Iterative Collision Resolution for Slotted ALOHA: An Optimal Uncoordinated Transmission Policy", in Proceedings of the International Symposium on Turbo Codes and Related Topics, Aug. 2012.

Ozisik, A. Pinar et al., "Graphene: Efficient Interactive Set Reconciliation Applied to Blockchain Propogation", SIGCOMM, 2019, pp. 303-317.

Richardson, Tom, "Multi-Edge Type LDPC Codes", IEEE, Apr. 20, 2004.

Rink, Michael, "Mixed Hypergraphs for Linear-Time Construction of Denser Hashing-Based Data Structures", SOFSEM, 2013, pp. 356-368.

* cited by examiner

METHOD FOR TRANSFERRING AN IBLT DATA STRUCTURE AND USER TERMINAL

CROSS-REFERENCE TO RELATED APPLICATIONS

This application is the United States national phase of International Patent Application No. PCT/EP2023/069266 filed Jul. 12, 2023, and claims priority to German Patent Application No. 10 2022 117 663.0 filed Jul. 14, 2022, the disclosures of which are hereby incorporated by reference in their entireties.

BACKGROUND OF THE INVENTION

Field of the Invention

The present invention relates to a method for transferring an invertible Bloom lookup table data structure (also referred to as an IBLT data structure) from a first user terminal to a second user terminal, a corresponding user terminal and a system for transferring an IBLT data structure. In addition, the present invention relates to a novel data structure and a storage medium on which the novel data structure is stored.

The invention can be used to synchronize data or data sets. In particular, the present invention provides a novel principle for data synchronization in which the computational complexity is reduced. The principle proposed by the invention allows an almost optimal complexity of the message exchange. This means that the amount of data that has to be exchanged in order to carry out a data comparison is reduced.

The present invention can also be used to reconcile data or data sets on multiple user terminals (also referred to as multi-party set reconciliation, [12]). In this case, three or more data sets can be reconciled with each other

Description of Related Art

The present invention proposes a novel solution to the set reconciliation problem. Among the various applications of data reconciliation, the reconciliation of databases in which two hosts A and B have different versions of the same database is particularly noteworthy. In most applications, the databases are relatively large and can contain several million entries, while the number of differences between the two versions of the databases is relatively small. A data reconciliation procedure allows hosts A and B to determine which entries differ between the two databases so that the two hosts ultimately have the same version of the database.

Probably the simplest solution to the above object is for hosts A and B to exchange their entire databases with each other. However, this solution is very inefficient, especially if the databases are quite large but the number of differences is small.

A common and more efficient solution to this problem is to use log files [1]. This requires the existence of prior context. This means that the databases of A and B were previously perfectly synchronized at a point in time t. From this point in time on, hosts A and B track all changes introduced to their databases in a log file. At a later point in time t'>t, hosts A and B can reconcile their databases by exchanging their log files. If the number of changes made between points in time t and t' is small, the size of the log file is also small and this solution is efficient.

However, the use of log files is inefficient or undesirable in some constellations. Firstly, log files become very large if data reconciliation is only carried out infrequently. In this case, the process becomes very inefficient. In addition, some so-called "hot entries" change very quickly in some applications, whereby several entries are made in the log file. Further, the use of log files becomes complicated, if more than two hosts take part in the synchronization process. It is assumed, for example, that three hosts A, B and C wish to reconcile their data bases. Hosts A and B have prior context, i.e. a log file, in which they keep track of their differences. The same shall be true for hosts A and C. However, hosts B and C have no prior context (log file) and can therefore not recover their data bases based on log files. Finally, the storage medium on which the log file is stored is subject to interferences, with the loss of the log files being tantamount to the loss of the prior context, whereby a context-free data reconciliation is forced. The solution proposed by the present invention is not based on the presence of prior context (log file) and is therefore not subject to the above-described limitations.

The problem of data reconciliation will be explained in more detail hereunder. Both hosts A and B are located in one data network and have different data sets $S_A$ and $S_B$, the elements of which are selected from a universal data set u. For the sake of simplicity, it is assumed that u is the set of all bit strings of the length l, i.e.

$$\mathcal{U} = F_2^\ell.$$

The data reconciliation problem consists in the generation of the element set, which is present in the join of $S_A$ and $S_B$, but not in their intersection $S = (S_A \cup S_B) \setminus (S_A \cap S_B)$. A key parameter is the (cardinality of the) set difference $d = |S|$ which corresponds to the number of the differences between the two data sets $S_A$ and $S_B$. If the set difference is large, hosts A and B can simply exchange their data sets. However, this solution is very suboptimal, if the set difference d is small.

In case that a single round of communication between hosts A and B is allowed (also referred to as one-way set reconciliation), the fundamental limitations were evaluated in [2]. There, it has been shown how an exact data reconciliation requires the transmission of ~tl bits, if an upper limit t of the set difference d is known (d≤t). In contrast thereto, the exact data reconciliation requires the transmission of the entire data set, if no upper limit t is known. In addition to the reachability limit, the paper in [2] also provides an optimal structure of the one-way data set reconciliation problem for the case that an upper limit t of the set difference is known. Specifically, it could be shown how the reconciliation can be achieved for two data sets $$S_A \subset F_2^\ell$$

and $$S_B \subset F_2^\ell,$$

while relying on a binary code of the length $2^\ell$ which can correct t errors. It has been shown that this solution comprises an optimal communication complexity, if a perfect code is used, while, however, a code of the length $2^\ell$ has to be used, which, apart from very small I-values, is impractical.

In [3], a method based on characteristic polynomial interpolation or CPI was proposed, which achieves a nearly optimal communication complexity. In particular, if an upper limit t of the record difference d is known, an exact data set reconciliation with a communication complexity ~tl and a time complexity $\mathcal{O}(t^3)$ is possible. If an upper limit to d is not known, the procedure presented in [3] can be used for any data set reconciliation, which leads to a communication complexity ~tl and a time complexity $\mathcal{O}(d^4)$. This method uses a characteristic polynomial of a data set, which is defined for a set $S=\{w_1, w_2, \ldots w_n\}$ as follows:

$$X_S(Z) = (Z - w_1)(Z - w_2) \ldots (Z - w_n),$$

where Z is selected such that it belongs to a limited field $F_q$ with $q>2^\ell$. The main observation here is that the zeros of $X_S(Z)$ correspond to the elements in S and can therefore be obtained by factorizing $X_S(Z)$. In particular, it is assumed that it is known that the two data sets to be reconciled differ in t elements at most. Host A evaluates the characteristic polynomials of its data set $S_A$, $X_{S_A}(Z)$ at t evaluation points $z_1, z_2, \ldots, z_t$ and sends the evaluations $X_{S_A}(z_1)$, $X_{S_A}(z_2), \ldots, X_{S_A}(z_t)$ to host B. Host B then evaluates the characteristic polynomials of its data set $X_{S_B}(Z)$ at the same t points and generates $$\frac{X_{S_A}(z_i)}{X_{S_B}(z_i)} = \frac{X_{S_A \cap S_B}(z_i) X_{\Delta_A}(z_i)}{X_{S_A \cap S_B}(z_i) X_{\Delta_B}(z_i)} = \frac{X_{\Delta_A}(z_i)}{X_{\Delta_B}(z_i)}$$

for $i=1, 2, \ldots, t$. It should be noted that the contributions of the common elements $S_A$ $S_B$ in cancel each other out, leaving only the ratio of the evaluations of the characteristic polynomials of $\Delta_A$ and $\Delta_B$, which correspond to the elements that are present in $S_A$ but not present in $S_B$ and vice versa. Next, Host B can recover the evaluations of $X_{\Delta_A}(Z)$ and $X_{\Delta_B}(Z)$ by rational function interpolation, which has a complexity of $\mathcal{O}(t^3)$ when t is known. Host B then has reconciled the data records. If no upper limit to d is known, two different strategies for approximate set reconciliation are proposed in [3]. With both strategies, host A continuously sends more and more evaluations of its characteristic polynomial $X_{S_A}(z_i)$ to host B. Host B can use two different strategies. According to the first strategy, host B can try to restore the set difference by performing a rational function interpolation after receiving each evaluation. This strategy leads to complexity $\mathcal{O}(d^4)$. According to the second strategy, host B does not attempt to restore the set difference after each evaluation point. Instead, host B attempts to restore the set difference after receiving a evaluation points (a>1). If this fails, a retry is made after $a^2$ evaluation points. Should this try also fail, a recovery is tried again after reception of $a^3$ evaluation points etc. This second strategy leads to a lower complexity than the first strategy, but has a higher communication complexity (more administrative data or overhead). While the complexity of the method proposed in [3] is significantly improved over the method proposed in [2], the complexity can still be inacceptable for moderate to large values of d.

In [1], a method for data set reconciliation (with low complexity) was proposed based on invertible Bloom lookup tables or IBLTs. Described on an abstract level, IBLT is a probabilistic data structure which supports the insertion and removal of data set elements, as well as the listing of all elements contained in the IBLT, provided the number of elements in the IBLT is not too high. On a data structure level, an IBLT can be divided into individual cells having a size ~I+log I, where I is the size of the data set elements. If an upper limit of the set difference is known, the IBLT described in [1] has a communication complexity ~ct(I+log l), where c≈1.22 and the time complexity is $\mathcal{O}(t(\ell+\log \ell))$. Therefore, this principle has an almost optimal communication complexity, while it is much less complex than the principle described in [3]. The original construction in [1] is based on regular invertible Bloom lookup tables (also called regular IBLT). Irregular IBLTs make it possible to improve the constant c. In particular, it was shown in [4] how a c=1.09 can be achieved by using the regular IBLTs of two different degrees. In [5], a density evolution analysis of a non-regular IBLT was presented, which allows to determine the constant c for an arbitrary non-regular IBLT. Moreover, it has been shown in this paper that it is possible to generate the constant c arbitrarily close to 1, which is the best possible constant based on the known results in the literature of random access protocols [6].

The main disadvantage of IBLT-based data reconciliation, as presented in [1], is the fact that (unlike CPI) it requires the knowledge of an upper limit t to the set difference (d≤t), which is often not available. In most cases, instead of an upper limit to d, an (inaccurate) estimate of d is available, which is referred to as $\tilde{d}$. This estimate is typically obtained based on an additional round of communication between the two hosts [1]. This communication round represents an important overhead, both in terms of time and overhead. If the set difference d is small, the effort associated with this first round of communication to estimate the set difference outweighs the effort associated with the actual reconciliation of the amounts [1].

As is to be expected, the estimate of the set difference d can deviate considerably from the actual set difference d. An overestimation ($\tilde{d}>d$) leads to an oversizing of the IBLT and thus to an unnecessarily high communication effort (bandwidth), while an underestimation ($\tilde{d}<d$) is very likely to lead to a failure of the algorithm for data set reconciliation. To avoid the latter case, the solution used in [1] consisted of overdimensioning the IBLT. In some cases, however, the size selected for the IBLT may not be large enough. In this case, the solution proposed in [1] was to replace a second, larger IBLT and try the adjustment again with this second (larger) IBLT only. This approach is clearly inefficient as it discards the IBLT that was exchanged first. This inefficiency was noted in [7], where it was suggested to use the two IBLTs to match the datasets, which increases the probability of a successful reconciliation.

Description of IBLT

The following is a formal description of an IBLT as a data structure and the operations it supports.

Let $S=\{z_1, z_2, \ldots, z_n\}$ be a set of elements, denoted by |S|=n. Assume that each element z is a key-value pair denoted as z=(x,y). The key x has the length v bits and the value y has the length $\kappa \gg \nu$ bits. For set reconciliation applications, let it be assumed that the key x is obtained as a function of y, x=g(y), where the mapping is several to one. This means that key collisions are possible in principle. However, if v is chosen large enough, the probability of key collisions can be kept small enough for practical applications.

Let a cell c be a data structure containing two different fields, denoted as count and data, where:

count is an integer. It contains the number of elements that have been mapped to this cell (details on mapping will follow).

data=(data.x, data.y) is a bit sequence of a length $\nu + \kappa$, which can be divided into a pair of bit sequences of a length v or κ. The bit sequences data.x and data.y each contain the binary XOR of the keys and values that were mapped to the cell.

Furthermore, two hash functions are to be defined:

$h_{\Lambda_i}(\mathcal{X})=d$ is a non-uniform random hash function which maps an input $\mathcal{X} \in \{0, 1\}^\nu$ to an output $d \in \{1, 2, \ldots, d_{max}\}$. The parameter $\Lambda=(\Lambda_1, \Lambda_2, \ldots, \Lambda_{d_{max}})$, which is referred to as a degree distribution, is a probability mass function. Assuming that the input x is uniformly distributed, $P(d=i)=\Lambda_i$, i.e. the output of $h_{\Lambda_i}(x)$ follows the degree distribution $\Lambda$.

$H_{m,d}(\mathcal{X})=g$ is a random hash function mapping an input $\mathcal{X} \in \{0, 1\}^\nu$ to a vector g of the length d of d different natural numbers in $\{1, 2, \ldots, m\}$ i.e. it accepts d different natural numbers between 1 and n without substitution. Such a hash function can be obtained from a uniform random hash function which outputs a natural number between 1 and $$\prod_{i=0}^{d-1}(m - i).$$

An irregular IBLT is a probabilistic data structure for storing elements of a quantity S. It is defined by its degree distribution A the number of cells (or the length) m and the random hash functions $h_{\Lambda_i}(\mathcal{X})$ and $H_{m,d}(\mathcal{X})$ An IBLT supports several operations: initialization, insertion, deletion and recovery;

Initialize( ). This operation describes the initialization and sets the different fields of all cells in the IBLT to zero (see algorithm 1).

Insert(z). This operation describes the insertion. It inserts the key-value pair z in the IBLT (see algorithm 2).

Delete(z). This operation describes the deletion. It deletes the key-value pair z from the IBLT (see algorithm 3).

Recover( ) This operation describes the recovery and aims at outputting all key-value pairs stored in the IBLT. If this operation provides the complete list of the key-value pairs in the IBLT, it is successful. Otherwise, if it provides an incomplete list, the list operation fails (see algorithm 4).

---

Algorithm 1 Initialization

--- procedure INITIALIZE( )
    for i = 1, 2, . . . , m do
        $c_i$.count = 0
        $c_i$.data = 0

---

---

Algorithm 2 Insertion

--- procedure INSERT(z)
    $d \leftarrow h_{\Lambda_1}(z.x)$
    $g \leftarrow H_{m,d}(z.x)$
    for i = 1, 2, . . . , d do
        $c_{g_i}$.count = $c_{g_i}$.count + 1
        $c_{g_i}$.data = XOR ($c_{g_i}$.data, z)

---

---

Algorithm 3 Deletion

--- procedure DELETE(z)
    $d \leftarrow h_{\Lambda_1}(z.x)$
    $g \leftarrow H_{m,d}(z.x)$
    for i = 1, 2, . . . , d do
        $c_{g_i}$.count = $c_{g_i}$.count − 1
        $c_{g_i}$.data = XOR ($c_{g_i}$.data, z)

---

---

Algorithm 4 Recovery

--- procedure RECOVER( )
    while $\exists i \in [1, m] | c_i$.count = 1 do
        add z = $c_i$.data to the output list
        call Delete (z)

---

Encoding of S into an IBLT

Mapping the n elements of S to an IBLT, which is also referred to as encoding, can be carried out as follows. Firstly, all cells are initialized to zero as described in algorithm 1. After initialization, the elements of S are sequentially inserted into the IBLT, as described in algorithm 2: for each element $z=(\mathcal{X}, y)$, $d=h_{\Lambda_i}(\mathcal{X})$, cells with indices $H_{m,d}(\mathcal{X})=g$ are selected. The element z is then XOR-concatenated with the data field (also referred to as data) of the cells, and their counting field (also referred to as count) is increased by one.

Recovery of S

The recovery (or decoding) operation consists in recovering all n elements of S from the irregular IBLT having the length m. The recovery is successful, if all m cells of the IBLT have a counting field (count) equal to zero. In this case, the output of the recovery operation contains all n elements that were inserted. Otherwise, if some cells have a count value other than zero, the recovery fails. In [8], an algorithm of low complexity was proposed for the recovery of IBLTs, which was instantiated for a regular IBLT. Algorithm 4 describes the recovery operation for an irregular IBLT. Here, cells are searched for, whose counting field is equal to one, since the data field of such cells is an element z of S. Then, z=(x, y) is first added to the output list and is thereafter deleted from the IBLT by calling the operation Delete (z), whereby z is removed from $h_{\Lambda_i}(\mathcal{X})=d$ cells with indices $H_{m,d}(\mathcal{X})=9$. Since a successful recovery requires the processing of all n elements of S and each element is mapped to $\bar{d}$ different cells on average, the complexity of the recovery operations scales with $\mathcal{O}(n\bar{d})$ (which corresponds to the complexity of the encoding).

Peeling Decoding

The recovery operation is an example for a peeling decoding [9]. An IBLT can be represented as a bipartite graph (or a Tanner graph) $\mathcal{G}=(\mathcal{Z} \cup \mathcal{C}, \varepsilon)$ consisting of a quantity of n data nodes $\mathcal{Z}$, a quantity of m cell nodes $\mathcal{C}$ and a quantity of edges ε. As the term already indicates, the data nodes represent key-value pairs and the cell nodes represent cells of the IBLT. A data node $z_i \in \mathcal{Z}$ and a cell node $c_i \in$ $\mathcal{C}$ are then and only then interconnected by an edge, if $z_i = (\mathcal{X}_i, y_i)$ is written into the cell $c_h$, i.e. $\exists k | g_k = h$, wherein $9 = H_{m,d}(\mathcal{X}_i)$ and $d = h_{\Lambda_i}(\mathcal{X}_i)$. A data node z and a cell node c are called neighbors if they are connected by an edge. Here, the short form $z \in \mathcal{N}$ (c) or $c \in \mathcal{N}$ (z) can be used. The degree of a node is given by the number of the nodes connected to this node. Thus, the degree of a cell node is equal to the counting field of the cell it represents.

The recovery of S can be represented as a peeling process on a bipartite graph, where the graph is unknown to the decoder and is revealed during the decoding process. In particular, if a cell node c of degree one is present, its only neighbor $\mathcal{N}$ (c)=z is determined. The key-value pair z, which is represented by the data node z, is added to the output list. Next, the found key-value pair is removed from the IBLT, which corresponds to the removal of all edges that are connected to the associated data node. This process is repeated until there are no more cell nodes of degree one. If all cell nodes are of degree zero at this stage, the recovery was successful and all key-value pairs are present in the output list. Otherwise, if there are some cell nodes with a degree greater than zero, the recovery will fail and the output list will not contain all key-value pairs.

Example (Peeling Decoding)

The various steps of the peeling process are shown in FIG. 1. FIG. 1*a* shows a bipartite graph of an IBLT before the peeling process begins. We see that the IBLT has m=5 cells and stores n=4 key-value pairs. At this stage, the bipartite graph shown is unknown to the decoder as it knows nothing about S. The decoder only knows the m cell nodes. For this reason, both the data nodes and the edges are shown in gray. The graph structure of the graph is successively revealed in the course of the recovery process and is only fully known if decoding is successful. Otherwise, part of the graph remains hidden. It can be seen that the cell node $c_3$ has the degree 1 and therefore the associated IBLT cell $c_3$ has a count value equal to 1. The restore operation reveals the single key-value pair mapped to cell $c_3$, i.e. data node $z_2$, which is added to the output list of the restore operation. Subsequently, $z_2$ is deleted from the IBLT. In the graph representation, this means that the only neighbor of the cell node $c_3$, the data node $z_2$ (now shown in black), is revealed and all edges connected thereto are removed, as shown in FIG. 1 *b*. Consequently, the degree of $c_1$ becomes 1. In the next step, as illustrated in FIG. 1*c*, the only neighbor of $c_1$, namely $z_i$, is revealed, and all edges connected thereto are removed. Thereby, the degree of $c_4$ decreases from 2 to 1. Then, the data node $z_4$ is revealed, since it is the only neighbor of $c_4$. After all edges connected to $z_4$ have been removed, two cell nodes with a degree of 1 exist, as shown in FIG. 1*d*, namely $c_2$ and $c_5$, which both have $z_3$ as their only neighbor. In the last step, illustrated in FIG. 1*e*, first, $z_3$ is revealed as the only neighbor of $c_2$. Finally, all nodes connected to $z_3$ are deleted from the graph. In this example, the recovery process was successful and the quantity S was completely recovered.

IBLT-Based Data Set Reconciliation

Hereinafter, the approximate data set reconciliation protocol proposed in [1] will be described. The protocol comprises the following steps:

1. First communication round. Host B signals A that it wishes to perform a data set reconciliation. At the same time, B transmits a data structure (known as a strata estimator) to B, which is to assist A in estimating the data set difference d.

2. Estimation of the data set difference. After receipt of the strata estimator, host A performs some processing steps to obtain an estimation $\tilde{d}$ of the data set difference d.

3. Estimation of the IBLT size. Host A obtains an approximate upper limit for the data set difference d by multiplying $\tilde{d}$ by a constant. This constant is selected such that, with high probability, t is larger than d, e.g. $t = 1.45\tilde{d}$. Next, host A generates an IBLT of a length m, $c^{\{A\}}$, wherein m is selected such that the IBLT is, with high probability, invertible if t elements are inserted into the same.

4. IBLT generation and exchange. Host A inserts all elements in $S_A$ in the IBLT $c^{\{A\}}$. Thereafter, host A sends $c^{\{A\}}$ to host B.

5. IBLT subtraction. Host B now generates a further IBLT of a length m, $c^{\{B\}}$ into which it inserts all elements of its quantity, $S_B$. Thereafter, host B subtracts the IBLT received from A from the locally generated IBLT. The resulting IBLT is referred to as $c^{\{B-A\}}$.

6. Decoding. Host B tries, $c^{\{B-A\}}$, to invert the IBLT resulting from the subtraction with the help of a modified recovery algorithm. If the recovery algorithm is successful, the data sets are successfully reconciled. As an alternative, steps 4, 5 and 6 can also be repeated with a larger IBLT of the size m'>m.

If the decoding of the first IBLT is not successful, it is clearly inefficient to discard the same. This inefficiency was also determined in [7]. This paper proposes to exchange a further IBLT of a length m' in case the decoding of the first IBLT fails. Then, the two bits, the first of a length m and the second of a length m', are decoded using the so-called ping-pong decoding. That means that it is first tried to sequentially decode the first and second IBLT. First, it is attempted to decode the first IBLT and all key-value pairs recovered from the first IBLT are deleted from the second IBLT. Thereafter, it is attempted to decode the second IBLT, where all key-value pairs recovered from the second IBLT are deleted from the first IBLT etc.

---

Algorithm 5 IBLT Subtraction

--- procedure $c^{\{B-A\}}$ = SUBTRACT($c^{\{B\}}$, $c^{\{A\}}$)

for i = 1, 2, . . . , m do $c_i^{\{B-A\}}$.count = $c_i^{\{B\}}$.count − $c_i^{\{A\}}$.count $c_i^{\{B-A\}}$.data = XOR($c_i^{\{B\}}$.data, $c_i^{\{A\}}$.data)

---

Algorithm 6 Check Purity

--- procedure b=ISPURE(z)

if z.x = g(z.y) then b = true else b = false

| Algorithm 7 Modified Recovery |
| --- |
| procedure RECOVER( ) |
|    while $\exists i \in [1, m] \| c_i.\text{count} = \pm 1 \& \text{IsPure}(c_i.\text{data}) = \text{true}$ do |
|       add z = $c_i$.data to the output list |
|       if $c_i$.count = 1 then |
|          call Delete (z) |
|       else |
|          call Add (z) |

Disadvantages of the Prior Art

The CPI method presented in [3] has the advantage that it has an almost optimal communication complexity (minimal overhead), but has the disadvantage that it is too complex. Specifically, it has the complexity $\mathcal{O}(d^3)$, if an upper limit to the data set difference d is known, and a complexity $\mathcal{O}(d^4)$, if an upper limit to d is not known (which is the case in practice). This complexity is too high for most applications.

The methods of [1] and [7] essentially have a linear complexity, but are disadvantageous in that they require an upper limit t to the data set difference d, which is usually not available. To obtain an (approximate) upper limit, these methods require an additional communication round so as to obtain an estimation $\tilde{d}$ for d. This additional communication round implies a certain waiting time for the back and forth transmission of the data as well as for the transmission of a substantial amount of data (overhead). Finally, the methods according to [1] and [7] exchange complete IBLTs, which is inefficient. In these methods, the size of the IBLT is set such that the differential quantity can be recovered with high probability, i.e. the IBLT is oversized in order to also satisfy a worst case scenario. In most cases, however, a smaller IBLT would be sufficient. For example, the method of [1] can select an IBLT length of 200 cells, if the estimated data set difference is $\tilde{d}$=100. This means that host A sends the entire IBLT (all 200 cells) to B. In many cases, however, the data set difference can also be decoded on the basis of the first 100 cells of the IBLT.

Advantages of the Present Invention

While entire IBLTs were exchanged in [1] and [7] before a reconciliation is attempted, the present invention proposes an incremental approach to data set reconciliation. Following the digital fountain approach [10] the present invention proposes that the transmitter (e.g. host A) transmits the cells of the IBLT to the receiver (e.g. host B) one by one. After receipt of each cell, the receiver (i.e. host B, for example) can attempt to reconcile the data sets. If the reconciliation of the quantities fails, the receiver waits for more cells and again attempts reconciliation. For example, if the data set reconciliation is successful, the receiver (i.e. host B, for example) can transmit an affirmation to the transmitter so that the same stops transmitting further cells. With this approach, it is possible to save bandwidth (reduction of communication effort), since the transmitter transmits only as many cells as needed.

For developing such a system, it is preferably also possible to adapt the concept of since IBLT, IBLTs were previously always defined for a fixed length m. In a preferred embodiment of the present invention, it is proposed, for the above-described problem, to introduce an adapted data structure referred to as multi-edge type IBLT data structure. It should be noted that a plurality of IBLT cells can optionally be transmitted together in one data package. In this case, the receiver (e.g. host B) can attempt decoding after receipt of every package that includes a plurality of IBLT cells.

Characteristic Properties of the Present Invention

The present invention is characterized by the following special features.

1. The fact that a transmitter sequentially sends IBLT cells. With each transmission, a data unit is transmitted which contains one or a plurality of cells. This can, for example, be repeated until an affirmation message is received from the receiver and/or until a preset maximum number of cells has been transmitted.
2. The preferred use of so-called multi-edge type (MET) IBLTs (description to follow). This is a special data structure which contributes to the improvement of the successive transmission of IBLT cells.
3. The fact that an initial communication round is not required for obtaining an estimation of the difference quantity. The successive transmission of stat cells enables the receiver to collect enough cells to recover the contents of the IBLT.
4. The fact that the receiver attempts to recover the IBLT after receipt of every data unit or a certain number of data units. If the recovery (decoding) is successful, the receiver can send an affirmation message to the transmitter, otherwise, it can wait for further IBLT cells.

Description of Multi-Edge Type IBLTs:

Different Types of IBLT cells and key-value pairs can be differentiated in a MET IBLT. Firstly, the IBLT cells will be considered. Each cell is assigned to a cell type i, wherein $i \in \{1, 2, \ldots d_c\}$ with dc is the maximum number of cell types (a design parameter). $m_i$ denotes the number of cells of the type i, where $m_i$ also is a design parameter. Now, the key-value pairs will be considered. Each key-value pair is connected with a key-value pair $j \in \{1, 2, \ldots, d_d\}$, with $d_d$ being the maximum number of key-value pair types and a design parameter. For assigning a type to a cell, it is possible in particular to use a hash function $h_\Upsilon$. In particular, a key-value pair z=(x, y) can be assigned to the key-value pair type $j = h_\Upsilon(z. \mathcal{X})$. In addition, each key-value-pair type is characterized by a degree vector $d_j = d_{1,j}, d_{2,j}, \ldots, d_{d_c,j}$, the length d, where $d_{i,j}$ corresponds to the number of cells of type i to which a key-value pair of the type j is mapped.

A MET IBLT can be graphically represented in a similar manner, as it has been explained above for regular and irregular IBLTs. In particular, in the graphic representation of a MET IBLT, each cell can be represented by a so-called cell nodes and each key-value pair by a so-called data nodes, wherein different types of cell nodes and data nodes can be differentiated, which are assigned to the different cells and key values. In this graphic representation, a cell node and a data node are connected by an edge only if the associated key-value pair is mapped n the associated cell. Therefore, the graphic representation of a MET IBLT contains $m_i$ cell nodes of the type i. Thus, the degree vector $d_j = d_{1,j}$, $d_{2,j}, \ldots, d_{d_c,j}$ describes the edge connectivity between cell and data nodes. In particular, $d_{i,j}$ describes the number of edges that connect a data node of the type j to cell nodes of the type i. Consequently, a so-called degree matrix $D = [d_{i,j}]$ can be used to describe the connectivity between the different types of data and cell nodes. Finally, the probability of a data node being of the type j is given by $\Upsilon_j$, $j \in \{1, 2, \ldots, d_d\}$, where $\Upsilon = [\Upsilon_j]$.

---

Algorithm 8 Insertion

--- procedure INSERT(z)
    $t \leftarrow h_{\Upsilon}(z.x)$
    for j= 1, 2, . . . $d_c$ do
        $d \leftarrow d_{j,t}$
        $g \leftarrow H_{m_j,d}(z.x)$
        $m^* = \Sigma^{j-1}_{i=1} m_j$
        for i = 1, 2, . . . , d do
            $c'_{m^*+g_i}$ count = $c_{m^*+g_i}$.count + 1
            $c_{m^*+g_i}$.data = XOR ($c_{m^*+g_i}$.data, z)

---

---

Algorithm 9 Deletion

--- procedure DELETE(z)
    $t \leftarrow h_{\Upsilon}(z.x)$
    for j= 1, 2, . . . $d_c$ do
        $d \leftarrow d_{j,t}$
        $g \leftarrow H_{m_j,d}(z.x)$
        $m^* = \Sigma^{j-1}_{i=1} m_j$
        for i = 1, 2, . . . , d do
            $c'_{m^*+g_i}$ count = $c_{m^*+g_i}$.count - 1
            $c_{m^*+g_i}$.data = XOR ($c_{m^*+g_i}$.data, z)

---

Example

For purposes of illustration, $$D = \begin{bmatrix} 2 & 0 & 1 \\ 2 & 3 & 3 \end{bmatrix}$$

and $\Upsilon$ =[0.25 0.25 0.5]. In this case, three different data node types and two different cell node types exist. Half the data nodes is of type three, while a quarter is of type one or two, respectively. For example, it can be observed that data nodes of type two are connected only to cell nodes of type two.

Algorithms 8 and 9 describe the insertion and deletion processes in a MET IBLT. As can be observed, the hash function $h_{\Upsilon}( )$ can be used in inserting (or deleting), in order to assign a key-value pair node to a type, namely in the same manner that $h_{A_1}( )$ was used to assign it to a degree in an irregular IBLT (see above, algorithms 2 and 3).

Rate-Compatible Data Set Reconciliation

An implementation of the proposed data set reconciliation can be designed as follows:

1. Let it be assumed as a starting point that the parameters which define the MET IBLT are known (they belong to the protocol definition). If this is not the case, the parameters have to be signaled in some way or other (either by so-called piggybacking in the first message or by relying on a first communication round). The parameters are $m_i$, i=1, 2, . . . $d_c$, $\Upsilon$ =($\Upsilon_1$, $\Upsilon_2$, . . . , $\Upsilon_{d_d}$), and $d_j$=$d_{1,j}$, $d_{2,j}$, . . . , $d_{d_c,j}$, and the hash functions are $h_{\Upsilon}(\mathcal{X})$ and $H_{m_i,d}(\mathcal{X})$.

2. The hosts A and B can each start to locally generate a MET IBTL (see also the following explanations). This is achieved by inserting each element of the quantity into the IBLT. A preferred configuration is such that the MET IBTL cells are sorted by the type, so that the first $m_i$ cells are the cells of type 1, followed by the cells of type 2, type 3 and so on, although this sorting is not obligatory.

3. Host A can now start to send data units of cells of its locally generated IBLT $c^{\{A\}}$ to host B until, for example, it receives an acknowledgement from host B or all $$\sum^{d_c}_{i=1} m_i$$

cells of the IBLT are sent.

4. After receipt of the $\ell$-th cell of $c^{\{A\}}$, host B can subtract the same from the $\ell$-th cell of its locally generated IBLT $c^{\{B\}}$ and thus obtain the $\ell$-th cell of the differential IBLT $c^{\{B-A\}}$. This subtraction consists in the subtraction of the counting field count of the $\ell$-th cell in $c^{\{A\}}$ from the counting field of the t-th cell in $c^{\{B\}}$ and in the calculation of an exclusive OR of the $\ell$-th cell of $c^{\{A.1\}}$ and $c^{\{B.1\}}$ (see algorithm 5).

5. Next, host B can perform a modified recovery algorithm on $c^{\{B-A\}}$ (which contains $\ell$cells) which, if successful, outputs the differential quantity $\mathcal{S}$ between $S_A$ and $S_B$ as its output. (see algorithm 7).

6. If the data set reconciliation is successful, host B can send a confirmation to host A, wherein the reconciliation protocol is terminated (without moving on to phase 2). Otherwise, host B can wait for further IBLT cells of host A.

7. If the IBLT decoding is still unsuccessful after receipt of the entire MET, an error message can be outputted.

Notes.

In the above embodiment, it should be noted that it is not ultimately necessary to first generate the entire MET IBLT. Instead, also the cells of type 1 can be generated and exchanged first. If the decoding is already successful with these cells, the protocol can then be terminated. Otherwise, both hosts can generate the cells of type 2 and to attempt reconciliation again. If the reconciliation is still unsuccessful, the cells of type 2 and the cells of type 3 can be exchanged, and so forth.

Its is further possible to change the value for the maximum number of cell types $d_c$ during the running operation, if necessary. This can be done by adding cells to D as needed according to predefined rules (e.g. by replication of progressing cells). A possible configuration is, for example, to choose D as follows:

$$D = \begin{bmatrix} 1 & 5 & 6 & 28 & 38 \\ 1 & 5 & 6 & 28 & 38 \\ & & ... & & \end{bmatrix}$$

with $Y = [\, 0.7868 \quad 0.0222 \quad 0.1557 \quad 0.0176 \quad 0.0177 \,]$ and $m_i = 2m_{i-1}$ If reconciliation is unsuccessful after the $\ell$-th cell, host B can store the state of $c^{\{B-A\}}$ after the unsuccessful recovery process and continue the process after insertion of the $\ell+1$-th cell. This should be obvious to a person skilled in the field of erasure coding.

If an estimate of the data set difference is available (probably by a first communication round between A and B), the parameters of the MET IBLT could be adapted to further enhance efficiency. In this case, host A could notify host B of the parameters to be used.

In a practical implementation, host A can send data units of a plurality of IBLT cells, e.g. 10 cells, to host B. In this case, host B can attempt to perform the decoding not in a cell-by-cell manner, but with consideration to all cells contained in the data unit.

If a header exists for indexing the transmitted data units, losses on the connection between host A and host B can also be detected and corrected. This characteristic is inherent to the successive transmission. In order to solve the problem of lost cells, it is advantageous that the receiver is able to identify each IBLT cell. This can be achieved, for example, with a data encapsulation mechanism having a counter which, upon each transmission of a cell, is incremented by 1 and carried forward.

SUMMARY OF THE INVENTION

In the framework of the present invention, a method for transmitting an invertible Bloom lookup table (IBLT) data structure from a first user terminal to a second user terminal is proposed, wherein the first user terminal and the second user terminal are located in a common network and each comprise a computing unit, a memory unit, and a communication unit, and wherein the method comprises the following steps:

splitting the IBLT data structure into individual data packages by the first user terminal, wherein the individual data packages have at least one cell of the IBLT data structure;

successively transmitting the individual data packages of the IBLT data structure from the first user terminal to the second user terminal until a predefined termination criterion has been reached.

The method according to the invention allows for particularly efficient transmission of an IBLT data structure and an optimized decoding under the aspect of communication efficiency. In particular, the transmission of the individual data packages of the IBLT data structure can already be terminated, if the recovery of the data set can be successfully performed at the second user terminal. In this way, the data quantity that has to be transmitted for the recovery of the data set can be significantly reduced—depending on the application. In other words, no or at least fewer data are exchanged according to the present invention, which are obsolete for the recovery of the data set at the receiver. Thereby, the communication effort is reduced in an advantageous manner. The first user terminal and the second user terminal correspond to the components described above as host A and host B. For example, these may be two computer units arranged in a common network.

According to a preferred embodiment of the method of the present invention, it can be provided that the predefined abortion criterion is defined such that the second user terminal has sent a confirmation message to the first user terminal by which it indicates to the first user terminal that a successful recovery of a data set has been performed by the second user terminal. In this case, the first user terminal knows that a further transmission of data packages is no longer required and terminates the transmission of further data packages.

As an alternative, it can be provided that the predefined abortion criterion is defined such that a predefined number of cells has been sent from the first user terminal to the second user terminal. For example, it may be known in an application scenario that it is highly probable that the transmission of 100 cells is sufficient for a full recovery of the data set at the second user terminal.

Furthermore, it can be provided that the predefined abortion criterion is defined such that a predefined number of cells has been received by the second user terminal. Thereby, it can additionally be considered that individual data packages might get lost during the transmission of the data packages. If it is assumed in an application example that the second user terminal typically requires 100 cells to successfully recover a data set with high probability, the data packages can be transmitted from the first user terminal to the second user terminal until the second user terminal has successfully received 100 cells. Thereby, the number of data packages or cells sent by the first user terminal can be set adaptively and in dependence on the quality of the communication channel between the first user terminal and the second user terminal, so that in the event of a high data loss rate, more cells are transmitted, and in the event of a low data loss rate, fewer cells are transmitted. In this embodiment, it can be provided, for example, that a counter is provided at the second user terminal, which is incremented every time a data package has been received. If a data package contains a cell, the counter value is incremented by a value. If a data package contains a plurality of cells, the counter value is correspondingly incremented by the number of cells contained in the data package. Here, it may be provided, for example, that the second user terminal informs the first user terminal about the number of cells received, either at regular intervals or when reaching a preset value.

Furthermore, it can be provided in the method according to the invention that the individual data packages of the IBLT data structure contain exactly one cell of the IBLT data structure. However, as an alternative, a data package can also comprise a plurality of cells as described above.

According to an embodiment of the method of the invention, it may be provided that the IBLT data structure is configured as a multi-edge type IBLT data structure. In the framework of the present invention, the multi-edge type IBLT data structure is also referred to as a MET (multi-edge type) IBLT. In a MET IBLT, it is in particular possible to distinguish between different types of IBLT cells, as well as key-value pairs.

It can also be provided that an IBLT cell type is assigned using a hash function.

It can further be provided that the cells of the IBLT data structure are sorted beforehand by their type, before successively transmitting the individual data packages of the IBLT data structure from the first user Terminal to the second user terminal. For example, the first type is transmitted first, the second type is transmitted thereafter, and the third type of cells is transmitted subsequently. For example, after the first type has been completely transmitted, the second user terminal can attempt to recover the data set. If the recovery is not successful, the recovery can be performed again after the second type has been completely transmitted. If the recovery fails again, the cells of the third type can be transmitted, etc.

Moreover, it can be provided in the method according to the invention that an error message is generated if all cells of the IBLT data structure have been transmitted to the second user terminal and the data set could still not be successfully recovered by the second user terminal.

Furthermore, to achieve the above-mentioned objects, a first user terminal is proposed which is configured to transmit an invertible Bloom lookup table (IBLT) data structure to a second user terminal, wherein the first user terminal comprises a first computing unit, a first memory unit and a first communication unit; and wherein the first user terminal is configured to split the IBLT data structure into individual data packages, wherein the individual data packages have at least one cell of the IBLT data structure; and successively transmit the individual data packages of the IBLT data structure to the second user terminal until a predefined abortion criterion is met.

Preferably, it can be provided with the first user terminal according to the present invention that the predefined abortion criterion is defined such that the second user terminal has sent a confirmation message to the first user terminal by which the second user terminal indicates to the first user terminal that a successful recovery of a data set has been performed by the second user terminal.

It may further be provided with the user terminal of the invention that the IBLT data structure is configured as a multi-edge type IBLT data structure.

Finally, a system for transmitting an invertible Bloom lookup table (IBLT) data structure is proposed in the framework of the present invention, comprising:

a first user terminal with a first computing unit, a first memory unit, and a first communication unit; and a second user terminal with a second computing unit, a second memory unit, and a second communication unit, wherein the first user terminal and the second user terminal are interconnected via a common network; and the first user terminal is configured to split the IBLT data structure into individual data packages, wherein the individual data packages have at least one cell of the IBLT data structure; and successively transmit the individual data packages of the IBLT data structure to the second user terminal until a predefined abortion criterion is met.

In addition, it can be provided with the system according to the present invention that the predefined abortion criterion is defined such that the second user terminal has sent a confirmation message to the first user terminal by which the second user terminal indicates to the first user terminal that a successful recovery of a data set has been performed by the second user terminal.

It is obvious to a skilled person that all technical features described in the context of the method according to the invention can as well be implemented analogously with the user terminal according to the present invention and the system according to the present invention.

The present invention can be applied in particular in the following field:

data bases (data base reconciliation)

distributed storage (remote synchronization of files)

distributed caching peer-to-peer (P2P) networks

In particular, the invention can also be used in a maritime environment to synchronize the local caches (data bases) of ships which comprise security certificates.

BRIEF DESCRIPTION OF THE DRAWINGS

In the following, the present invention is described in more detail with reference to the Figures. In the Figures.

DESCRIPTION OF THE INVENTION

Figure 1:
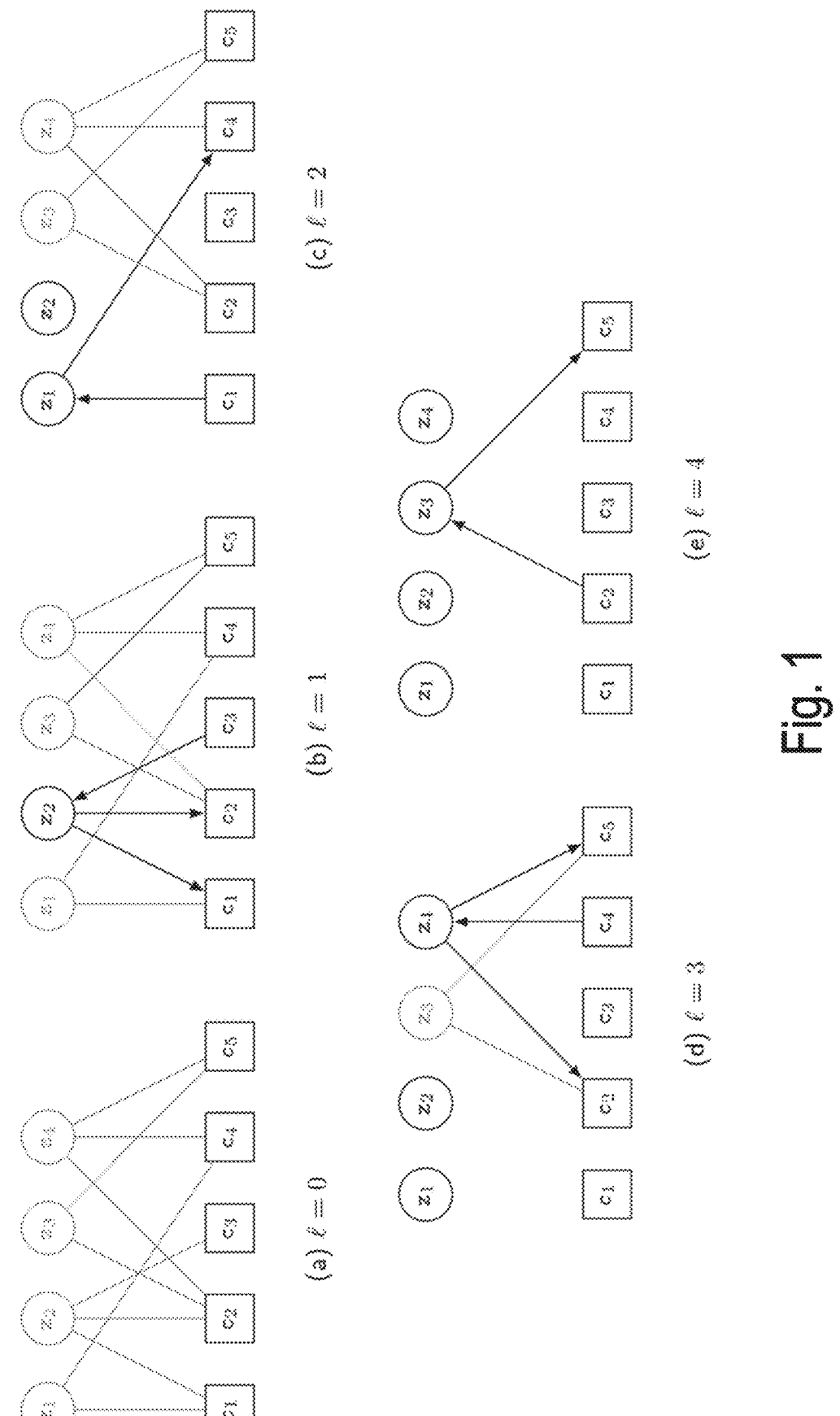
FIG. 1 shows the peeling process in the graphic representation of an IBLT with n=4 key-Value pairs and m=5 cells, with the index $\ell$ being used to characterize the different steps of the recovery process.

FIG. 1 was already discussed in detail in the previous sections.

Figure 2:
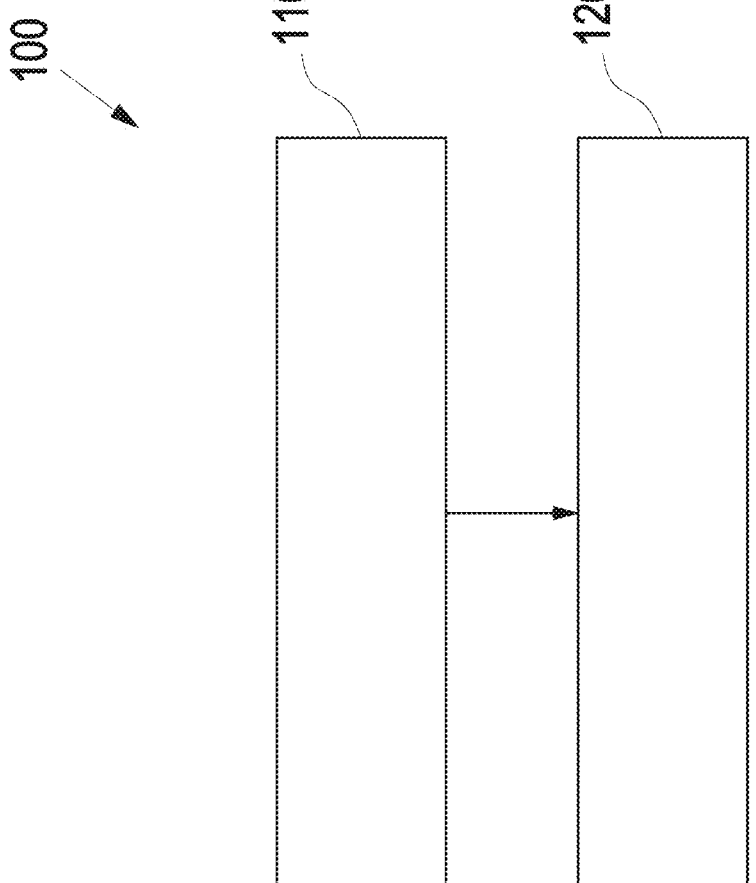
FIG. 2 shows an embodiment of the method according to the invention.

FIG. 2 shows an embodiment of the method 100 according to the invention for transmitting an IBLT data structure from a first user terminal to a second user terminal. In a first method step 110, the first user terminal splits the IBLT data structure in individual data packages, with the individual data packages comprising one or a plurality of cells of the IBLT data structure. In a second method step 120, the first user terminal successively transmits the individual data packages to the user terminal, until a predefined abortion criterion is met. The abortion criterion can in particular be defined such that the second user terminal has sent a confirmation message to the first user terminal by which the second user terminal indicates to the first user terminal that a successful recovery of a data set has been performed by the second user terminal. In this manner, the data quantity transmitted between the first user terminal and the second user terminal can be significantly reduced.

Figure 3:
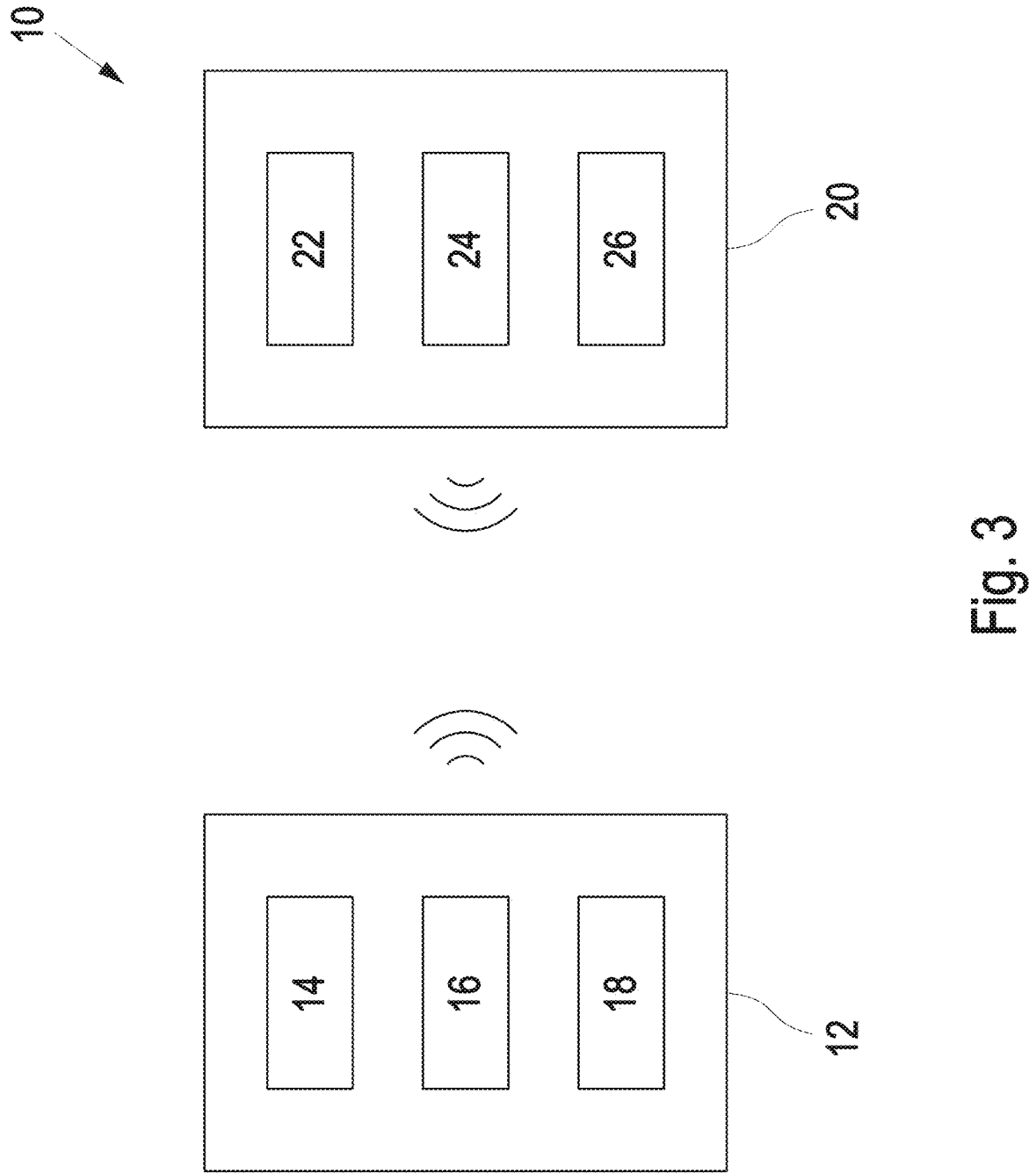
FIG. 3 shows an embodiment of the system according to the invention.

FIG. 3 shows an embodiment of the system 10 according to the invention. The system 10 comprises a first user terminal 12 as well as a second user terminal 20. The first user terminal 12 has a first computing unit 14, a first memory unit 16, as well as a first communication unit 18. The second user terminal 20 has a second computing unit 22, a second memory unit 24, as well as a second communication unit 26. The first user terminal 12 and the second user terminal 20 are arranged in a common network and are configured to exchange data with one another. The data can be transmitted in a wired manner or—as illustrated in FIG. 3—via a wireless telecommunication means. The first user terminal 12 is configured to split the IBLT data structure in individual data packages, with the individual data packages comprising one or a plurality of cells of the IBLT data structure. In addition, the first user terminal is configured to successively transmit the individual data packages of the IBLT data structure to the second user terminal 20 until a predefined abortion criterion is met.

Figure 4:
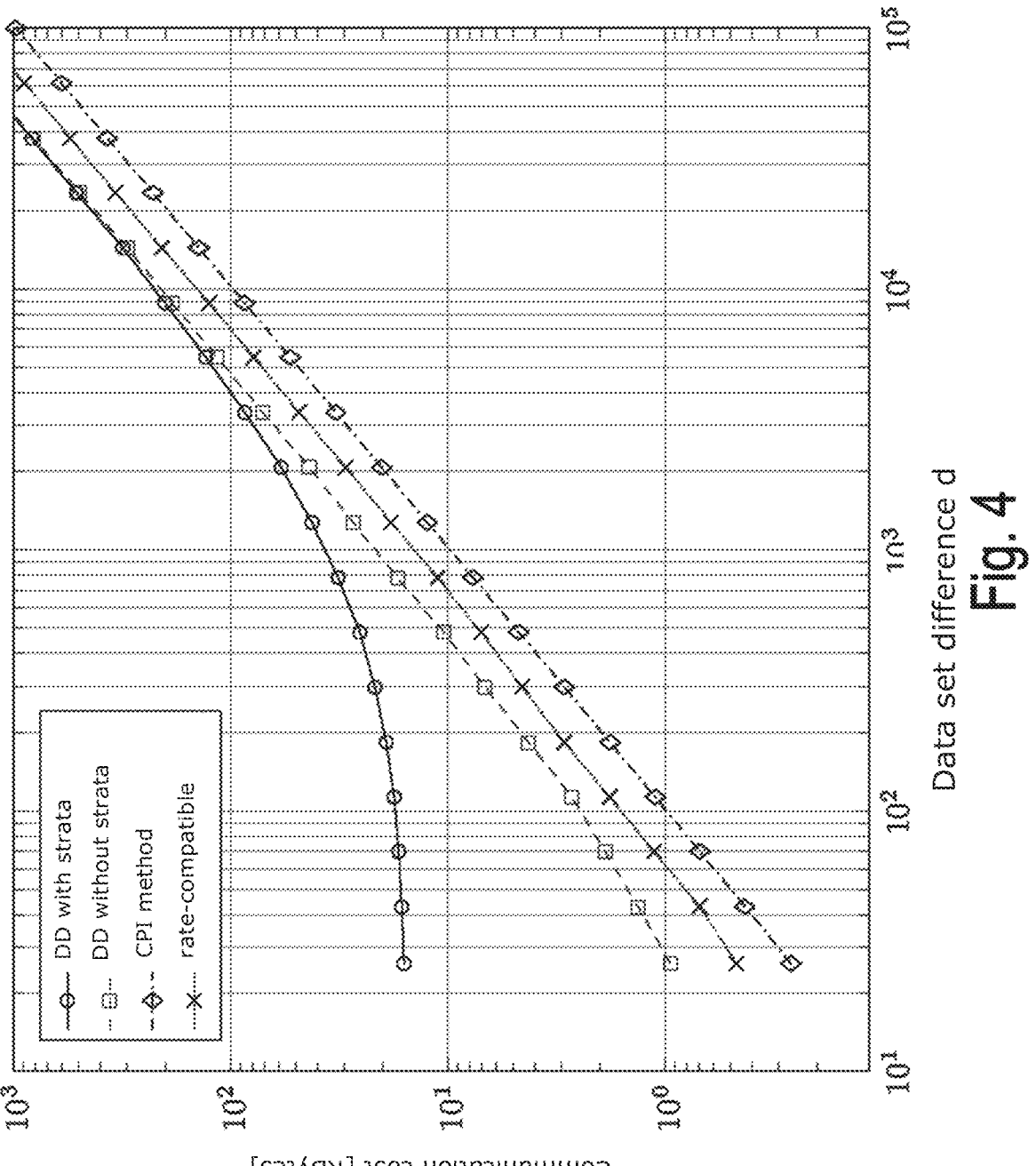
FIG. 4 shows a performance comparison between the method according to the invention and prior art.

Finally, FIG. 4 shows the quantity of the exchanged data (also referred to as communication cost) for the synchronization of two data sets of 1E5 elements in dependence on the data set difference. The line with circles ("DD with strata") corresponds to the method according to [1], the line with squares ("DD w/o strata") corresponds to the method according to [1] without consideration of the overhead for the estimation of the data set difference (strata estimator). The line with diamonds corresponds to the CPI scheme according to [3]. Finally, the line with crosses corresponds to the rate-compatible method proposed by the present invention. Referring to FIG. 4, the following shows a comparison of the communication complexity (quantity of the exchanged data) between the proposed method and the method of [1] and [3]. A quantity of 1E5 elements shall be considered, which are selected from the quantity of the 32 bit bitstrings $\{0, 1\}^{32}$. As can be seen in FIG. 4, significantly fewer data are exchanged in the proposed method than in the method of [1]. Specifically, the savings in exchanged data is greater with lower values of the data set difference, wherein, due to the estimation of the data set difference, the overhead is large as compared to the size of the IBLT required for the reconciliation of the data sets. Moreover, it can be seen in FIG. 4, that in the proposed method, slightly more data have to be exchanged than in the CPI scheme of [3]. However, it should be noted that the complexity of the CPI method is much higher. Overall, it can be stated that the method proposed with the present invention provides an almost optimum communication cost at low complexity. In other words, the method of the present invention combines the advantageous characteristics of the methods proposed in [1] and [3].

LIST OF REFERENCE NUMERALS

10 system
12 first user terminal
14 first computing unit
16 first memory unit
18 first communication unit
20 second user terminal
22 second computing unit
24 second memory unit
26 second communication unit
100 method
110 first method step
120 second method step

List of Abbreviations

IBLT invertible Bloom lookup table
CPI characteristic polynomial interpolation
LDPC low-density parity-check
MET multi-edge-type

LIST OF REFERENCES

[1] D. Eppstein, M. Goodrich, F. Uyeda, and G. Varghese, "What's the difference?: Efficient set reconciliation without prior context", ACM SIGCOMM Comp. Commun. Review, vol. 41, no. 4, pp. 218-229, 2011.
[2] M. Karpovsky, L. Levitin, and A. Trachtenberg, "Data verification and reconciliation with generalized error-control codes," IEEE Trans. Inf. Theory, vol. 49, no. 7, pp. 1-2, 2003.
[3] Y. Minsky, A. Trachtenberg, and R. Zippel, "Set reconciliation with nearly optimal communication complexity," IEEE Trans. Inf. Theory, vol. 49, no. 9, pp. 2213-2218, 2003.
[4] M. Rink, "Mixed hypergraphs for linear-time construction of denser hashing-based data structures," in Proc. of the Int. Conf. on Current Trends in Theory and Practice of Comp. Science. Springer, 2013, pp. 356-368.
[5] F. Lázaro and B. Matuz, "Irregular invertible Bloom look-up tables," in Proc. of the 11th Int. Symp. on Topics in Coding. IEEE, 2021, pp. 1-5.
[6] K. Narayanan and H. Pfister, "Iterative collision resolution for slotted ALOHA: An optimal uncoordinated transmission policy," in Proc. of 7th Int. Symp. on Turbo Codes and Iterative Inf. Processing (ISTC). Gothenburg, Sweden: IEEE, 2012, pp. 136-139.
[7] P. Ozisik, G. Andresen, B. Levine, D. Tapp, G. Bissias, and S. Katkuri, "Graphene: Efficient interactive set reconciliation applied to Blockchain propagation," in Proc. of Conf. of the ACM Special Interest Group on Data Commun. Beijing, China: ACM, August 2019, pp. 303-317.
[8] M. Goodrich and M. Mitzenmacher, "Invertible Bloom lookup tables", in 2011 49th Annual Allerton Conference on Communication, Control, and Computing (Allerton). Monticello, IL, USA: IEEE, 2011, pp. 792-799.
[9] M. Luby, M. Mitzenmacher, and A. Shokrollahi, "Analysis of random processes via and-or tree evaluation," in Proc. of the 9-th annual ACM-SIAM Symp. on Discrete Algs. San Francisco, CAL, USA: ACM, 1998, pp. 364-373.
[10] J. Byers, M. Luby, and M. Mitzenmacher, "A digital fountain approach to reliable distribution of bulk data," IEEE J. Sel. Areas Commun., vol. 20, no. 8, pp. 1528-1540 October 2002.
[11] T. Richardson and R. Urbanke, "Multi-edge type LDPC codes," in Workshop honoring Prof. Bob McEliece on his 60th birthday. Pasadena, California: California Institute of Technology, May 2002.
[12] M. Mitzenmacher and R. Pagh, "Simple multi-party set reconciliation," Distrib. Comput., vol. 31, no. 6, pp. 441-453, 2015, doi: 10.1007/s00446-017-0316-0.

The invention claimed is:

1. A method for transferring an Invertible Bloom Lookup Table (IBLT) data structure from a first user terminal to a second user terminal, wherein the first user terminal and the second user terminal are within a common network and each have a computing unit, a memory unit and a communication unit, and wherein the method comprises the following steps:
splitting, at the first user terminal, the IBLT data structure into individual data packages, each individual data package comprising at least one cell of the IBLT data structure;
successively transferring the individual data packages from the first user terminal of the IBLT data structure to the second user terminal over a network;
attempting, at the second user terminal, to decode the IBLT data structure using the individual data packages after each transmission; and
terminating the transmission when a predefined termination criterion has been satisfied, where the predefined termination criterion is defined as successful decoding of the IBLT data structure by the second u and confirmed by message from the second user terminal to the first user.

2. The method according to claim 1, wherein the predefined termination criterion is satisfied when the second user terminal has sent a confirmation message to the first user terminal indicating that the IBLT data structure has been performed by the second user terminal.

3. The method according to claim 1, wherein the individual data packages of the IBLT data structure comprise exactly one cell of the IBLT data structure.

4. The method according to claim 1, wherein the IBLT data structure is designed as a multi-edge type IBLT data structure.

5. The method according to claim 4, wherein a hash function is used to assign an IBLT cell.

6. The method according to claim 4, wherein the cells of the IBLT data structure are sorted beforehand by their type, before successively transmitting the individual data packages of the IBLT data structure from the first user terminal to the second user terminal.

7. The method according to claim 1, wherein an error message is generated if all cells of the IBLT data structure have been transmitted to the second user terminal and the data set could still not be successfully reconstructed.

8. A first user terminal system, configured to transmit an Invertible Bloom lookup table (IBLT) data structure, comprising:

a first user terminal comprising a computing unit, a memory unit, and a communication unit; and a second user terminal comprising a computing unit, a memory unit, and a communication unit, wherein the first user terminal is configured to split the IBLT data structure into individual data packages, each of the individual data packages comprising at least one cell of the IBLT data structure;

successively transmit the individual data packages of the IBLT data structure to the second user terminal; and terminate the transmission when a predefined termination criterion bas been satisfied, wherein the predefined termination criterion is defined as successful decoding of the IBLT data structure by the second user terminal and confirmation of the successful decoding in a message sent from the second user terminal to the first user terminal.

9. The user terminal according to claim 8, wherein the predefined termination criterion is satisfied when the second user terminal has sent a confirmation message to the first user terminal indicating that the IBLT data structure has been performed by the second user terminal.

10. The user terminal according to claim 8, wherein the IBLT data structure is designed as a multi-edge type IBLT data structure.

11. A system for transmitting an Invertible Bloom lookup table (IBLT) data structure, comprising:

a first user terminal including a computing unit, a memory unit and a communication unit; and a second user terminal including a computing unit, a memory unit and a communication unit;

wherein the first user terminal and the second user terminal are connected via a common network; and the first user terminal is configured to split the IBLT data structure into individual data packages, the individual data packages comprising at least one cell of the IBLT data structure; and successively transmit the individual data packages of the IBLT data structure to the second user terminal;

and terminate the transmission when a predefined termination criterion has been satisfied, wherein the predefined termination criterion is defined as successful decoding of the IBLT data structure by the second user terminal and confirmation of the successful decoding in a message sent from the second user terminal to the first user terminal.

12. The system according to claim 11, wherein the predefined termination criterion is satisfied when the second user terminal has sent a confirmation message to the first user terminal indicating that a successful decoding of the IBLT data structure has been performed by the second user terminal.

13. An Invertible Bloom lookup table data structure designed as a multi-edge type IBLT data structure, wherein different types of IBLT cells and key-value pairs are differentiated in the multi-edge type IBLT data structure.

14. A non-volatile storage medium which stores an IBLT data structure according to claim 13.

* * * * *